(12) United States Patent
Inage

(10) Patent No.: US 7,925,806 B2
(45) Date of Patent: Apr. 12, 2011

(54) INFORMATION TRANSCEIVER, METHOD AND STORAGE MEDIUM

(75) Inventor: Yoshiyuki Inage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 12/004,070

(22) Filed: Dec. 20, 2007

(65) Prior Publication Data

US 2008/0294804 A1 Nov. 27, 2008

(30) Foreign Application Priority Data

Mar. 5, 2007 (JP) ................................ 2007-053680

(51) Int. Cl.
*G06F 21/00* (2006.01)
*G06F 3/01* (2006.01)
(52) U.S. Cl. ............................... 710/62; 710/18; 710/64
(58) Field of Classification Search ...................... 710/18
See application file for complete search history.

(56) References Cited

U.S. PATENT DOCUMENTS

| 4,837,679 | A * | 6/1989 | Wiles et al. ...................... 710/54 |
| 6,553,236 | B1 * | 4/2003 | Dunko et al. ............... 455/456.1 |
| 6,611,888 | B2 * | 8/2003 | Tiede ............................... 710/63 |
| 7,058,734 | B2 * | 6/2006 | Chen et al. ....................... 710/18 |
| 2005/0246282 | A1 * | 11/2005 | Naslund et al. .................. 705/52 |
| 2006/0251442 | A1 * | 11/2006 | Fuqua et al. ..................... 399/80 |
| 2008/0005426 | A1 * | 1/2008 | Bacastow et al. ............... 710/62 |
| 2008/0214166 | A1 * | 9/2008 | Ramer et al. ............... 455/414.3 |
| 2009/0006675 | A1 * | 1/2009 | Rofougaran ..................... 710/62 |
| 2009/0058822 | A1 * | 3/2009 | Chaudhri ....................... 345/173 |
| 2009/0228979 | A1 * | 9/2009 | Forstall et al. .................. 726/21 |
| 2010/0317401 | A1 * | 12/2010 | Lee et al. ....................... 455/557 |

FOREIGN PATENT DOCUMENTS

JP 2003-345931 12/2003
JP 2006-114960 4/2006

* cited by examiner

*Primary Examiner* — Cheng-Yuan Tseng
(74) *Attorney, Agent, or Firm* — Staas & Halsey LLP

(57) ABSTRACT

An information transceiver including a storage unit storing usage information transferred from a provider device, an information transferring unit transferring the usage information to a user device when a usage start request is received in a state of being connected to the user device, an information monitoring unit performing processing for making the user device monitor a usage of the usage information and store usage record information after the usage information is transferred to the user device, an ending processing unit performs processing for making the user device read and transfer the usage record information after the user device deletes the usage information when a usage end request is received in the state of being connected to the user device, a location information monitoring unit obtaining present location information from an external location information service site for transmission when a communication request is received from the provider device.

12 Claims, 15 Drawing Sheets

INFORMATION TRANSCEIVER, METHOD AND STORAGE MEDIUM

This application is related to and claims priority to Japanese patent application No. 2007-53680 filed on Mar. 5, 2007, in the Japan Patent Office, and incorporated by reference herein.

BACKGROUND OF THE INVENTION

1. Field of the Invention

The present technology relates to an information transceiver, a method and a storage medium for transceiving usage information such as personal information between a provider device and a user device. The present technology is favorably adapted to the information transceiver, the method and the storage medium in order to properly manage the usage information if the user device is unspecified.

2. Description of the Related Art

In the conventional technology, in order to ensure safe transceiving of personal information used in an information processing system, data is encrypted and stored in a storage medium such as a CD-ROM that is to be transferred by hand. Rules for handling the transferred data are defined in a confirmation note and the like. However, it is impossible to confirm how the data is actually handled.

There is known an access record management system of a data carrier that confirms how the transferred data is handled. In the access record management system, when the data carrier is accessed, access time information and location information of a communication terminal that was used at the accessed time are transmitted to a management server from the communication terminal in which the data carrier is loaded For managing the distribution of personal information, there is also known a method for forming a capsule of personal information. The capsule of personal information is formed by putting together personal information, a personal information disclosure policy and a disclosure usage policy. The disclosure of personal information is controlled based on the disclosure usage policy, which is intended by an information provider to be used under any circumstance.

However, in the conventional management of personal information usage as described above, it is only possible to confirm a handling state of the transferred personal information of only a certain user device connected to the management server through a network. Also, there is no way to confirm how the transferred personal information is handled in a user device which is not connected to the management server.

Thus, the problem is that it is impossible for the provider to confirm the handling state if the personal information is left in the user device without being deleted, or if a copy of the personal information is made in spite of the handling rules even after the storage medium in which the personal information is stored has been returned to the provider.

Moreover, if the storage medium having the personal information is lost or stolen, there is no way to properly manage the personal information transferred to the user.

It is an object of the present technology to provide an information transceiver, method and storage medium which are capable of confirming a usage state, and which make it possible to securely prevent a misuse and a leakage of personal information when receiving the usage information such as personal information transferred through a medium and the like.

SUMMARY OF THE INVENTION

Therefore, according to an aspect of the present invention, there is provided an information transceiver including a storage unit storing usage information transferred from a provider device, an information transferring unit transferring the usage information to a user device when a usage start request is received in a state of being connected to the user device, an information monitoring unit performing processing for making the user device monitor a usage of the usage information and store usage record information after the usage information is transferred to the user device, an ending processing unit performs processing for making the user device read and transfer the usage record information after the user device deletes the usage information when a usage end request is received in the state of being connected to the user device, a location information monitoring unit obtaining present location information from an external location information service site for transmission when a communication request is received from the provider device.

According to the present technology, the information transceiver for transceiving usage information, e.g., personal information, to a user functions by generating and storing the usage record information of the personal information in the user device. The information transceiver retrieves and stores the usage record information at the end of the usage, and displays the stored usage record information when returning it to a provider. This makes it possible to confirm the handling state of the personal information at the user.

Accordingly, appropriate countermeasures can be taken if a copy of the personal information is made or a leakage of personal information is caused in spite of the handling rules.

Also, the user device is checked to see whether or not the personal information was left in the user device at the end of usage. If the personal information was left, the remaining personal information is deleted by embedding invalid data, so that it is possible to securely prevent a misuse or a leakage of the remaining personal information after the information transceiver is returned to the provider.

Moreover, if the information transceiver is lost or stolen, it is possible to receive present location information obtained from an external location information service site by transmitting a communication request toward a targeted device from the provider device. This location information gives a clue for searching the information transceiver which is lost or stolen.

The above-described embodiments of the present invention are intended as examples, and all embodiments of the present invention are not limited to including the features described above.

DETAILED DESCRIPTION OF THE PREFERRED EMBODIMENTS

Figure 1:
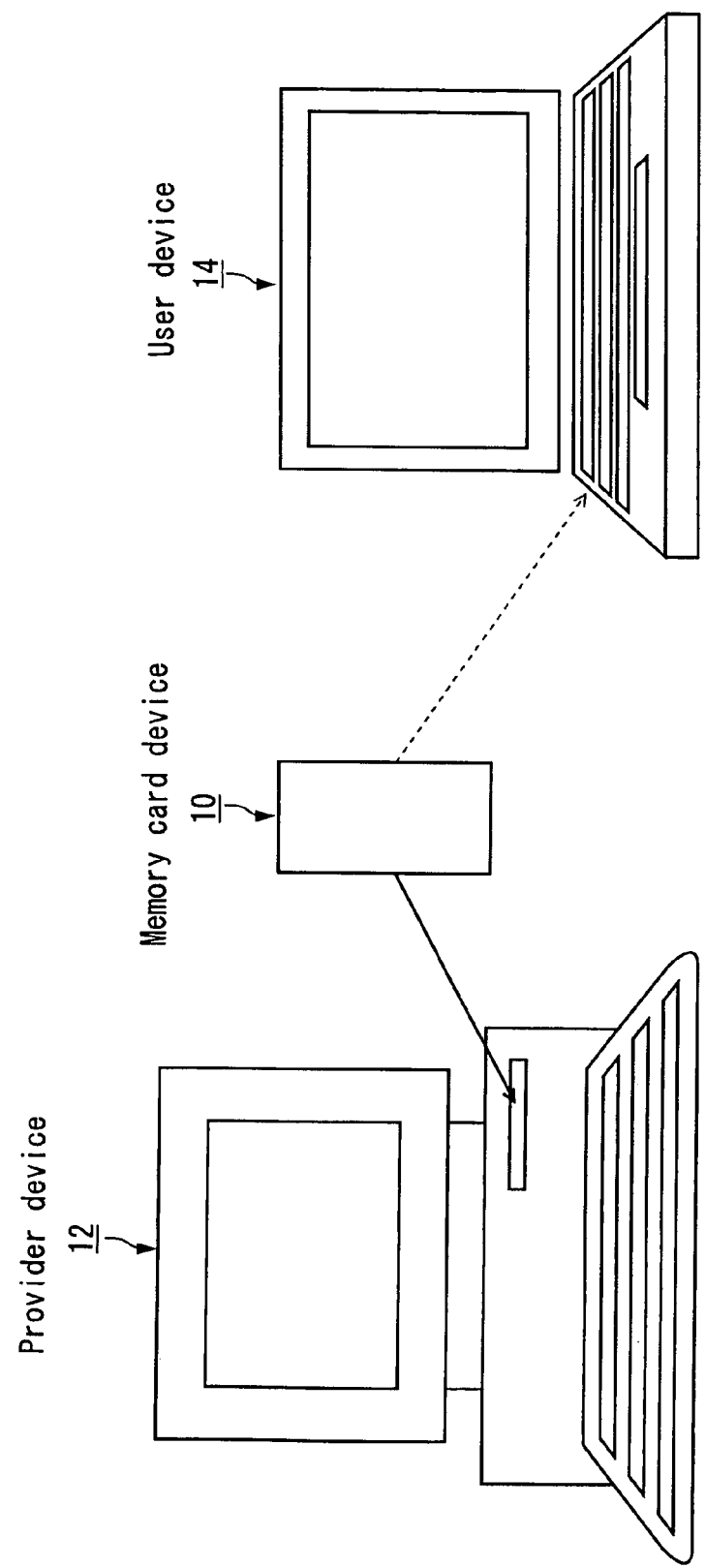
FIG. 1 is an illustration of an embodiment using a memory card device as an information transceiver.

Reference may now be made in detail to embodiments of the present invention, examples of which are illustrated in the accompanying drawings, wherein like reference numerals refer to like elements throughout.

FIG. 1 is an illustration of an embodiment using a memory card device as an information transceiver. As shown in FIG. 1, a memory card device 10 is connected to a provider device 12 in order to store usage information such as personal information. The memory card device 10 is then connected to a user device 14, so that the stored personal information can be transferred to be used in the user device 14.

Figure 2:
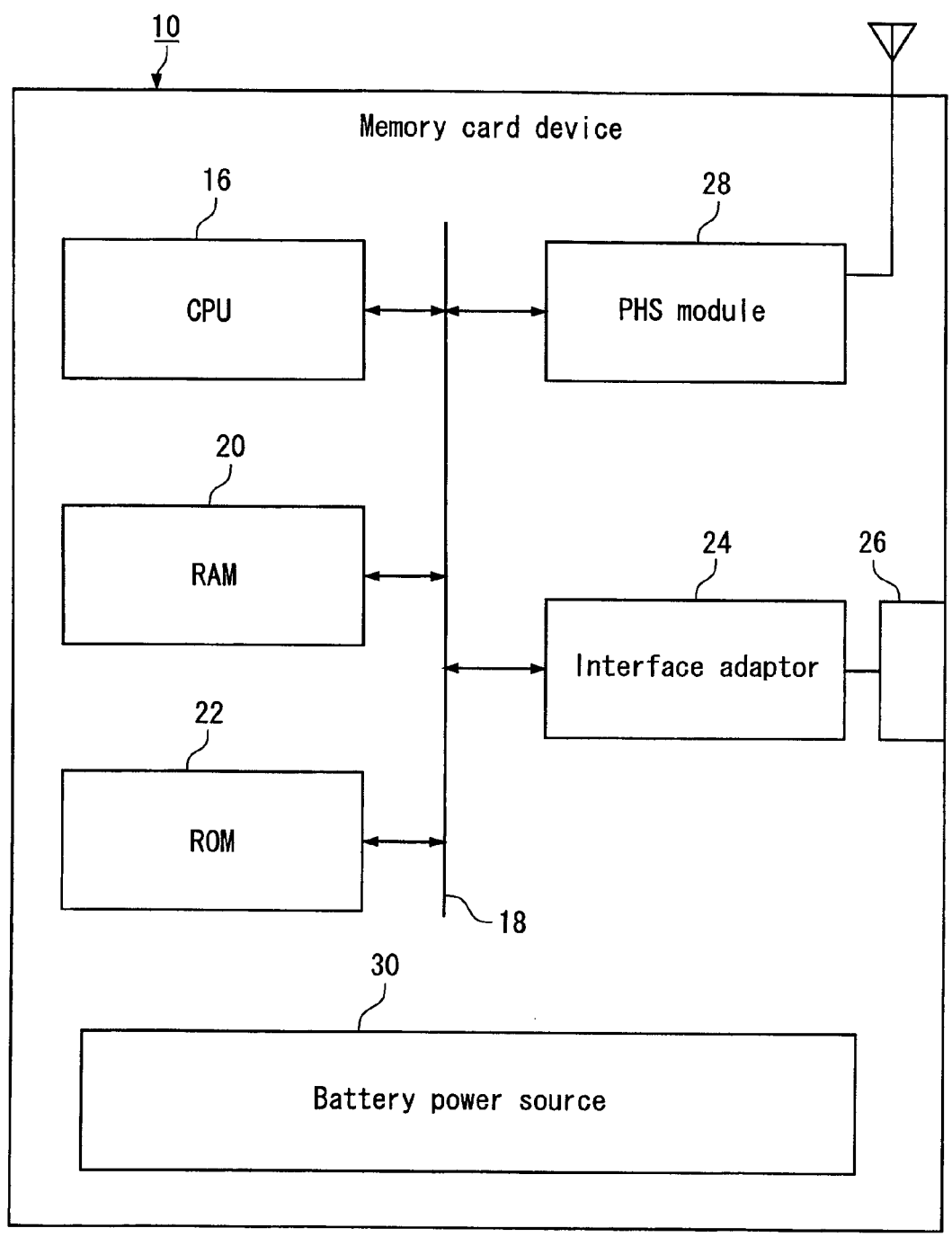
FIG. 2 is a block diagram of the memory card device of FIG. 1.

FIG. 2 is a block diagram of the memory card device of FIG. 1. As shown in FIG. 2, the memory card device is provided with a CPU 16. A RAM 20, a ROM 22, an interface adaptor 24 having an interface connector 26 and a PHS module 28 operating as a radio communication module are connected to a bus 18 of the CPU 16. The memory card device 10 is also provided with a battery power source 30.

Figure 3:
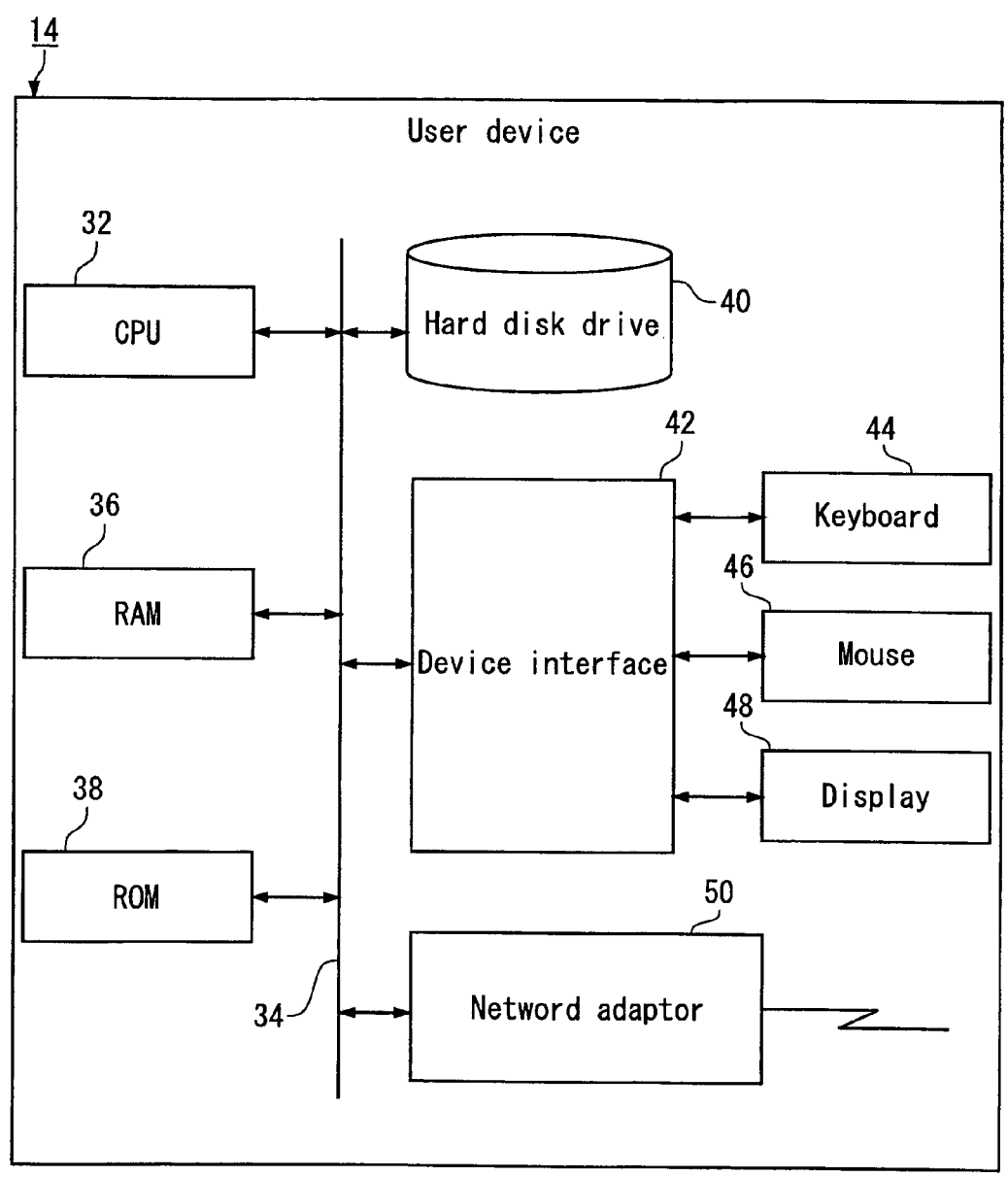
FIG. 3 is a block diagram of a user device of FIG. 1.

FIG. 3 is a block diagram of the user device of FIG. 1. The user device 14 is generally a normal personal computer. As shown in FIG. 3, the user device 14 is provided with a CPU 32. A RAM 36, a ROM 38, a hard disk drive 40, a device interface 42 connecting a keyboard 44, a mouse 46 and a display 48, and a network adaptor 50 are connected to a bus 34 of the CPU 32.

Figure 4:
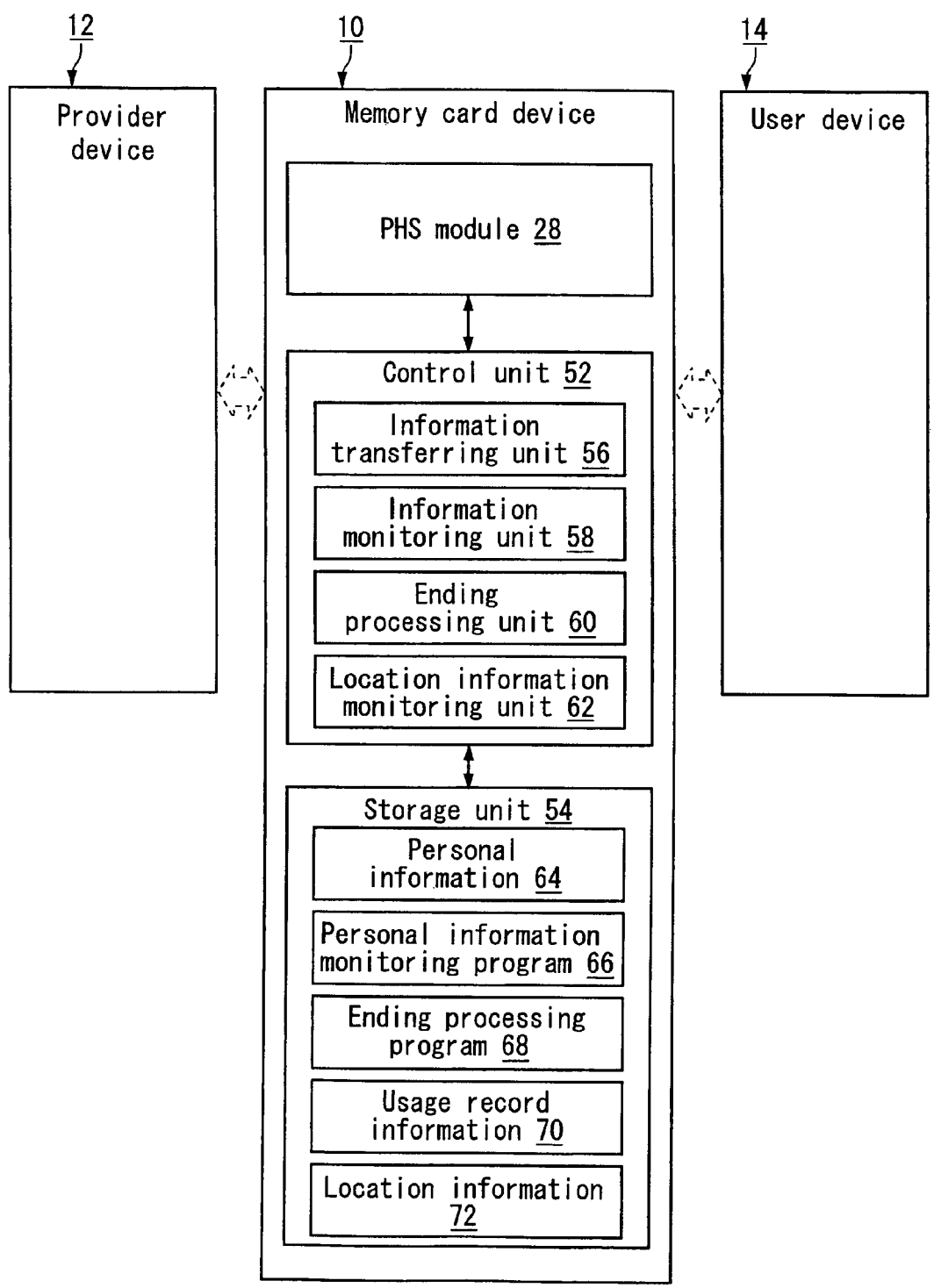
FIG. 4 is a block diagram of a memory card device of the present embodiment.

FIG. 4 is a block diagram of a function configuration of the memory card device of the present embodiment. As shown in FIG. 4, the memory card device 10 of the present embodiment comprises a control unit 52, a storage unit 54 and the PHS module 28.

The control unit 52 is realized by a function of a program which is read to RAM 20 from the ROM 22 and allocated by the CPU 16 of FIG. 2. Substantially, the function performs input-output control to the provider device 12 and the user device 14. The storage unit 54 is also a function realized by the RAM 20 of FIG. 2.

The control unit 52 is provided with functions of an information transferring unit 56, an information monitoring unit 58, an ending processing unit 60, and a location information monitoring unit 62. The storage unit 54 also stores personal information 64, a personal information monitoring program 66, an ending processing program 68, a usage record information 70 and a location information 72.

When the memory card device 10 is connected to the provider device 12, the personal information 64, the personal information monitoring program 66 and the ending processing program 68 are transferred to the storage unit 54 and stored. In this case, the personal information 64 transferred from the provider device 12 to the storage unit 54 to be stored is self-extracting encrypted data.

The information transferring unit 56 provided in the control unit 52 reads the personal information 64 and transfers it to the user device 14 to be stored, when the memory card device 10 is connected to the user device 14 and a usage start request of personal information is received. The personal information 64 copied to the user device 14 is automatically self-extracted so that it is usable when the personal information 64 is copied to the user device 14.

The information monitoring unit 58 reads and transfers the personal information monitoring program 66 to the user device 14 to be copied in synchronization with transferring the personal information 64. By performing the personal information monitoring program 66 in the user device 14, the information monitoring unit 58 performs processing in a way that the user device 14 monitors the usage of the personal information 64 and generates the usage record information for the storage.

When a usage end request is received from the user device 14 while the memory card device 10 is connected to the user device 14, the ending processing unit 60 reads and transfers the ending processing program 68 to the user device 14 to be copied. By performing the ending processing program 68 in the user device 14, the ending processing unit 60 performs processing in a way that the user device 14 reads and stores the stored usage record information in the storage unit 54 as the usage record information 70 after deleting the remaining personal information, and deletes the personal information monitoring program 66 and the ending processing program 68 which are stored in the user device 14.

When the memory card device 10 is connected to the user device 14, the location information monitoring unit 62 uses the PHS module 28 to access the external location information service site and the like, thereby obtaining the present location information, e.g., latitude and longitude, to be stored as the location information 72 in the storage unit 54.

The function of the location information monitoring unit 62 is realized by performing, by the CPU 16, the location information monitoring program previously stored in the ROM 22 of the memory card device 10 of FIG. 2.

Figure 5:
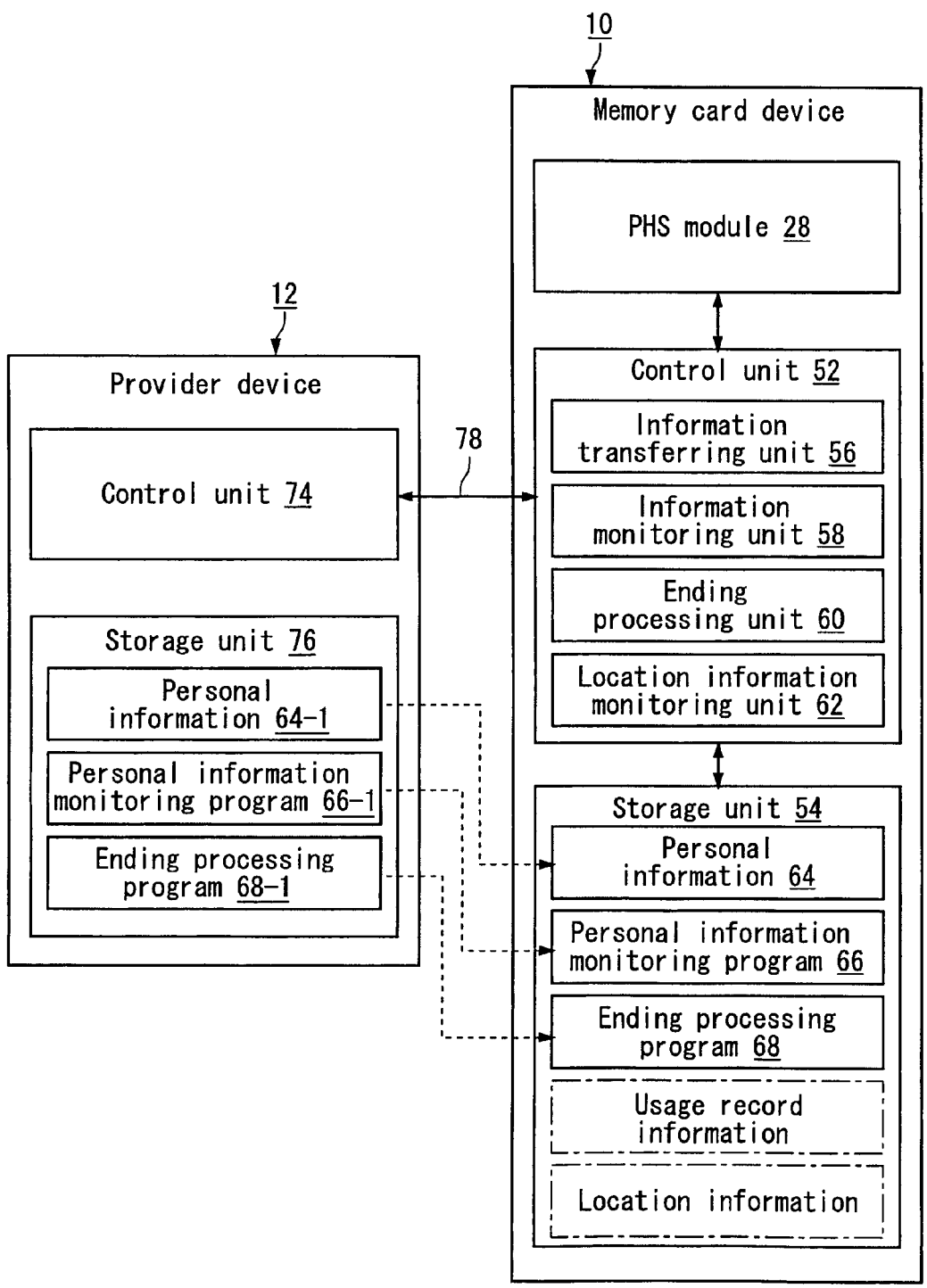
FIG. 5 is an illustration of a processing function for storing personal information in a memory card device from a provider device.

FIG. 5 is an illustration diagram of a processing function for putting the personal information in the memory card device 10 from the provider device 12. As shown in FIG. 5, the provider device 12 is a personal computer which is similar to the user device 14, and includes a control unit 74 and a storage unit 76. A personal information 64-1 is stored in the storage unit 76 as self-extracting data, along with a personal information monitoring program 66-1 and an ending processing program 68-1.

The memory card device 10 is connected to the provider device 12 with an interface signal line 78 in order to put the personal information in the memory card device 10 from the provider device 12. In this state, the personal information 64-1, the personal information monitoring program 66-1 and the ending processing program 68-1 in the storage unit 76 are written to be transferred to the memory card device 10 by user operation of the provider device 12.

With this arrangement, the personal information 64, the personal information monitoring program 66 and the ending processing program 68 are transferred to be stored in the storage 54 of the memory card device 10. The personal information 64 stored in the storage unit 54 of the memory card device 10 is self-extracting data.

Figure 6:
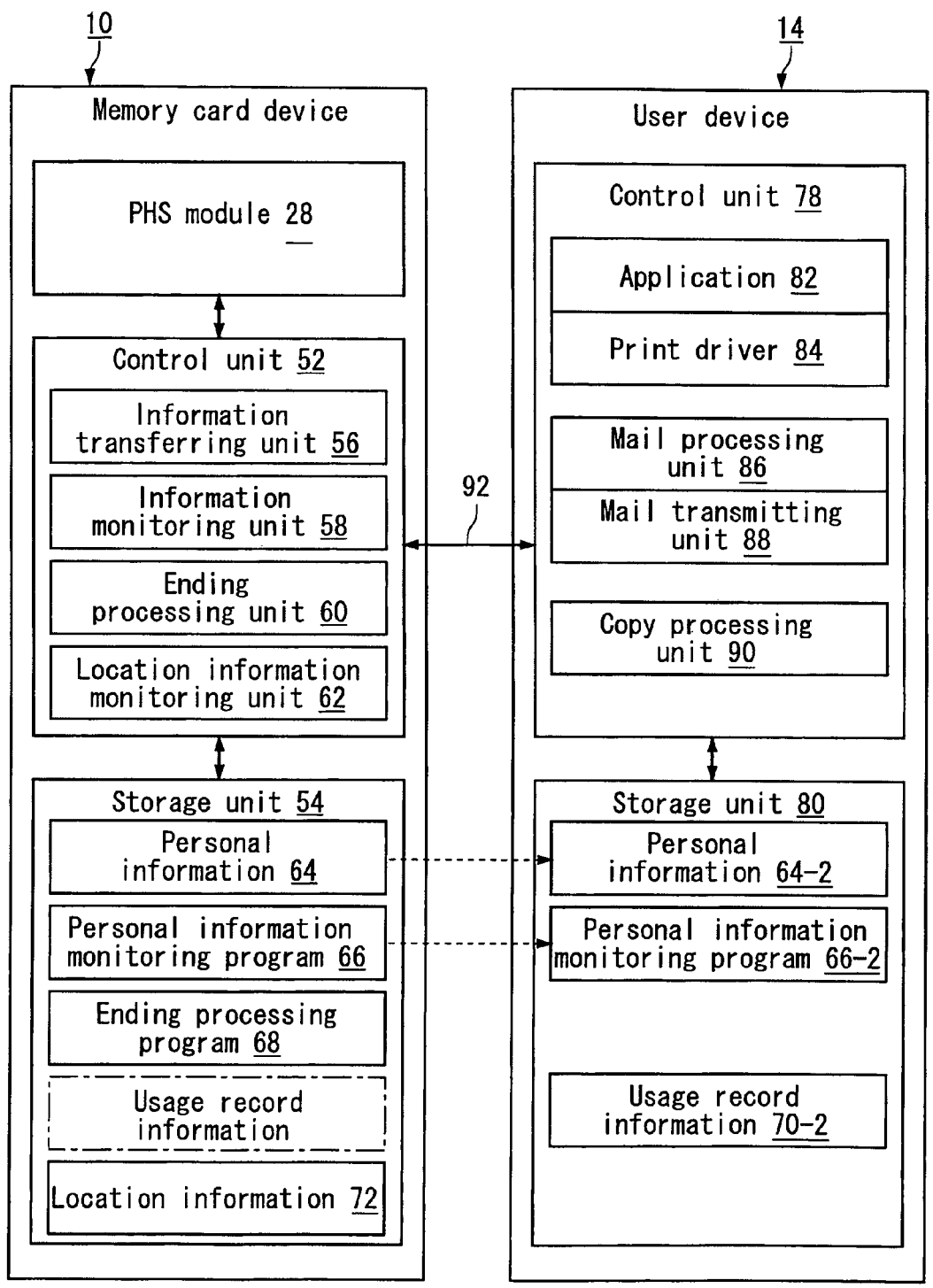
FIG. 6 is an illustration of a processing function for transferring personal information to a user device from a memory card device.

FIG. 6 is an illustration diagram of a processing function for transmitting the personal information to the user device 14 from the memory card device 10. As shown in FIG. 6, the memory card device 10 in which the personal information is transferred from the provider device 12 is connected to the user device 14 with an interface signal line 92, as shown in FIG. 5.

Since the user device 14 is a normal personal computer as shown in FIG. 3, when the memory card device 10 is connected to the user device 14 with the interface signal line 92, a connection to an external device is recognized by a processing function of the OS realizing a control unit 78, and a driver corresponding to the memory card device 10 is operated. For example, as shown in a My Computer screen 94 of Windows (R) of FIG. 7(A), a device mark 95 is additionally displayed for the newly connected memory card device 10 as one of "devices having removal storage area", and "information transceiver (F)" is also displayed for the device mark 95.

Therefore, a user clicks the device mark 95 of the My Computer screen 94 of FIG. 7(A) in order to use the personal information obtained by the memory card device 10 in the user device 14. For example, it is possible to open an information transceiving folder screen 96 as shown in FIG. 7(B), by clicking the device mark 95 with the mouse. A transceiver folder screen 98 and a personal information usage end folder 100 are shown in the information transceiving folder screen 96.

A user clicks the transceiver folder screen 98 in order to use the personal information obtained by the memory card device 10. A usage start request is transmitted in a command format to the memory card device 10 from the user device 14 by clicking the transceiver folder screen 98 with the mouse.

Specifically, a command of the usage start request is a copy processing command for reading and transferring the personal information 64 and the personal information monitoring program 66 of the storage unit 54 of FIG. 6 to be copied to the storage unit 80 as a personal information 64-2 and a personal information monitoring program 66-2.

Specifically, the information transferring unit 56 of FIG. 6 performs the copy processing for reading and transferring the personal information 64 in response of the usage start request transmitted from the user device 14. Subsequently, the copy processing for reading and transferring the personal information monitoring program 66 is synchronously performed by the information monitoring unit 58.

The personal information 64-2 copied from the memory card device 10 to the storage unit 80 of the user device 14 is self-extracted after being copied and becomes usable in the user device 14. The personal information monitoring program 66-2 is automatically installed after being copied and goes to a performing state. The personal information monitoring program 66 is performed in a way that subsequent usage events of the personal information 64-2 including copying of the personal information 64-2 are monitored. Usage record data showing usage content is also generated and stored as a usage record information 70-2 if there is a usage event.

In the control unit 78 of the user device 14, for example, there is an application 82, a mail processing unit 86, and a copy processing unit 90 or the like as processing using the personal information 64-2 transferred from the memory card device 10.

The application 82 outputs the personal information 64-2, for example, towards a print driver 84, for performing printing. The mail processing unit 86 also performs processing for transmitting outwards the personal information as an attached file or the like from a mail transmitting unit 88. The copy processing unit 90 also copies the personal information 64-2 in order to generate the other personal information.

The personal information monitoring program 66-2 monitors all the events using the personal information 64-2 performed by the application 82, the mail processing unit 86 and the copy processing unit 90 and the like. The usage content is also generated as a usage record and is stored in the usage record information 70-2 by the personal information monitoring program 66-2.

As shown in FIG. 6, the memory card device 10 does not have to be connected to the user device 14 after the personal information 64-2 and the personal information monitoring program 66-2 are copied by connecting the memory card device 10 to the user device 14. The memory card device 10 is also removed from the user device 14 and is stored separately. The copied personal information monitoring program 66-2 is performed on a side of the user device 14 so that the usage record information 70-2 of the personal information 64-2 can be continuously obtained and generated even when the memory card device 10 is not connected to the user device 14.

Figure 8:
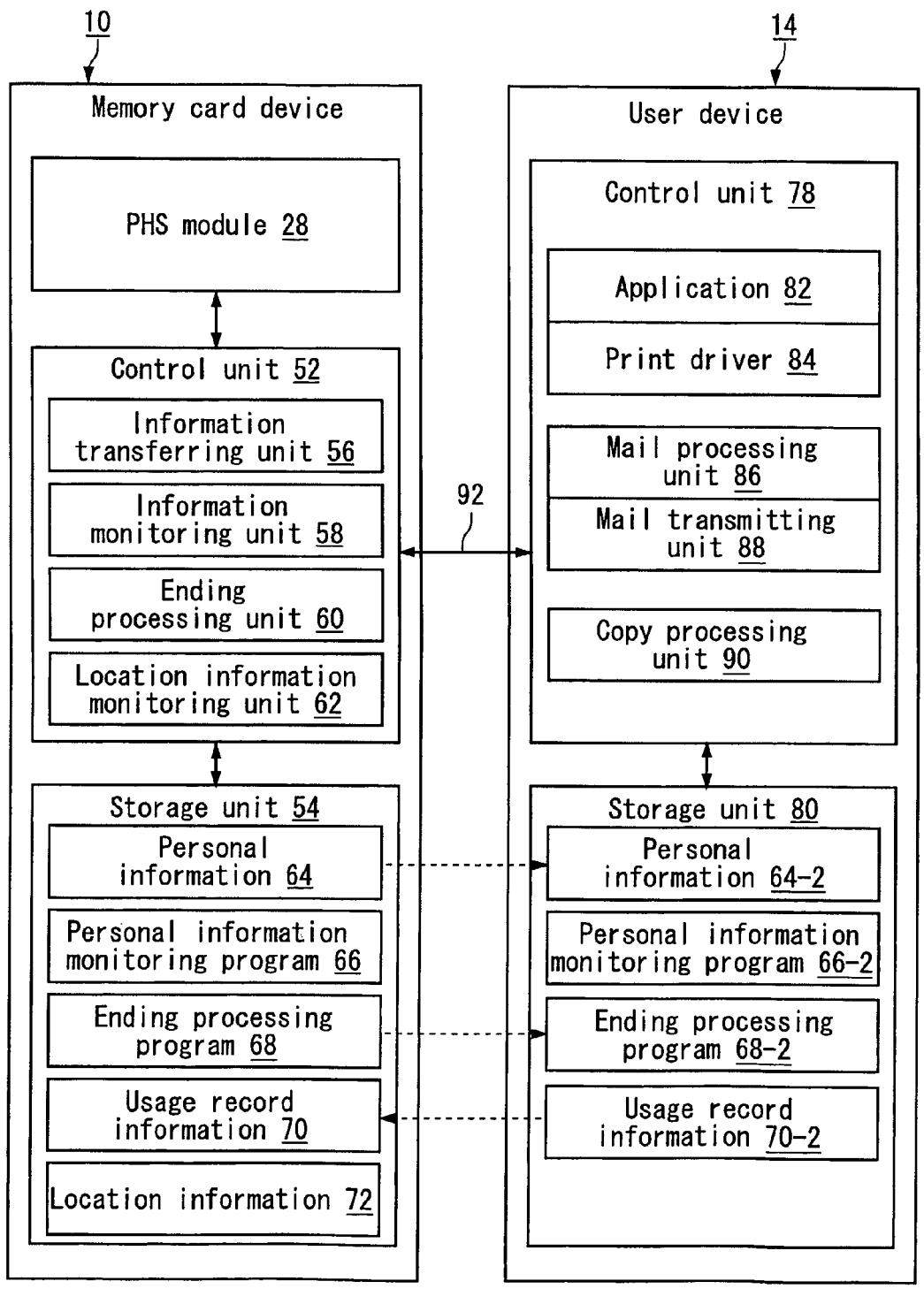
FIG. 8 is an illustration of a processing function for ending the usage of personal information in a user device.

FIG. 8 is an illustration diagram of a processing function for ending the usage of the personal information in the user device 14. As shown in FIG. 8, the stored memory card device 10 is reconnected to the user device 14 with the interface signal line 92 in order to end the usage of the personal information 64-2 in the user device 14.

If the memory card device 10 is connected to the user device 14, the user device 14 recognizes the connected memory card device 10 as a new external device. As shown in FIG. 7(A), the device mark 95 indicating "transceiver (F)" is displayed inside of the opened My Computer screen 94.

Then, the information transceiving folder screen 96 of FIG. 7(B) is opened when the device mark 95 is clicked with the mouse in order to end the usage of the personal information. The usage end request is transmitted to the memory card device 10 from the user device 14 when a personal information usage ending folder 100 is clicked with the mouse in order to end the usage of the personal information.

The usage end request transmitted from the user device 14 is recognized by the ending processing unit 60 of the memory card device 10. The ending processing program 68 and the personal information 64 are also read and transferred to the user device 14, and are copied to be stored in the storage unit 80 as an ending processing program 68-2 and the personal information 64-2. The personal information 64-2 copied to the storage unit 80 is self-extracting encrypted data and becomes usable by self-extracting automatically after being copied.

The reason why the personal information 64 and the ending processing program 68 are copied at the same time is that the personal information of the storage unit 80 has to be deleted in principle when the usage of the personal information is ended in the user device 14. Accordingly, the personal information which was used until then is not left in principle when the usage start request is transmitted from the user device 14.

Therefore, when receiving the usage end request from the user device 14, the ending processing unit 60 of the memory card device 10 reads and transfers the personal information 64 and the ending processing program 68 at the same time in order to copy them to the storage unit 80. The personal information 64-2 copied together with the ending processing program 68 is self-extracted, and is then used to detect the remaining personal information by comparing processing and delete the remaining personal information in the user device 14.

That is, the ending processing program 68-2 copied to the user device 14 from the memory card device 10 is automatically installed after being copied and goes to a performing state. The ending processing program 68-2 in the performing state firstly deletes the remaining personal information in the user device 14.

That is, as standard data, the personal information 64-2 copied to and extracted in the storage unit 80 is compared to the remaining personal information in the user device 14 to check whether or not all of the personal information corresponding to the personal information 64-2 was deleted from the user device 14. If the personal information is left, the remaining personal information is deleted by embedding valid data of zeros for all bits.

After the personal information in the user device 14 is deleted, the usage record information 70-2 is read from the storage unit 80 and transferred to the memory card device 10 in order to be copied to the storage unit 54 as the usage record information 70.

After the usage record information 70-2 is copied, the remaining personal information 64-2 of the user device 14, the personal information monitoring program 66-2 and the usage record information 70-2 are deleted. Then, the ending processing program 68-2 itself is also deleted and a sequence of the usage ending processing is completed.

If the usage ending processing in the user device 14 is ended, the memory card device 10 is removed from the user device 14 and is returned to the provider of the personal information. The memory card device 10 returned to the provider device 12 as shown in FIG. 1 is connected with the interface signal line at the provider receiving the memory card device 10 from the user.

The usage record information 70 in the folder of the memory card device 10 opened there by the provider device 12. Thus, the usage record information of the memory card device 10 is retrieved by reading and copying the usage record information 70. It is also possible to confirm how the personal information was handled in the user device 14 by checking the content of the usage record information.

Moreover, if the memory card device 10 transferred to the side of the user device 14 is lost or stolen, a communication request is transmitted from the provider device 12 through a PHS line in order to obtain location information of the lost memory card device 10 by using a PHS address, because the PHS address of the memory card device 10 is managed on the side of the provider device 12.

The communication request transmitted from the provider device 12 is received by the PHS module 28 provided in the memory card device 10 which was lost or stolen. The location information monitoring unit 62 provided in the control unit 52 accesses the external location information service site and the like in order to obtain and transmit the present location information, e.g., latitude/longitude, for transmission of a response. Thus, the present location information of the memory card device 10 which was lost or stolen can be obtained in the provider device 12.

In this way, the location information of the memory card device 10 which was lost or stolen can be obtained in the provider device 12. Therefore, it is possible to obtain a sufficient clue for searching for the memory card device 10 which was lost or stolen.

Figure 9:
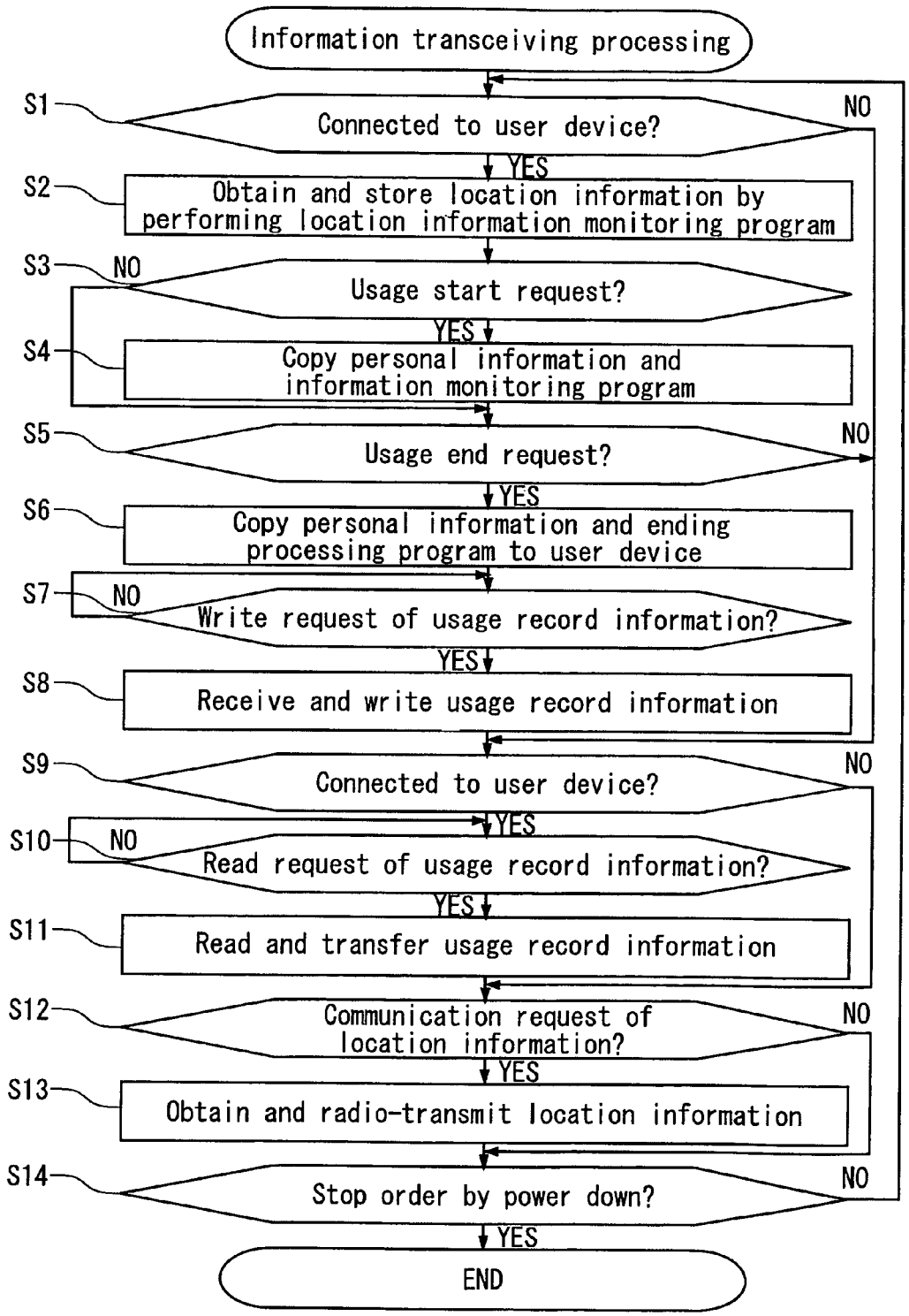
FIG. 9 is a flow chart showing information transceiving processing of a memory card device according to an embodiment.

FIG. 9 is a flow chart showing information transceiving processing of the memory card 10 according to the present embodiment. An explanation with reference to FIG. 6 and FIG. 8 is as below.

As shown in FIG. 9, the information transceiving processing of the memory card device 10 checks whether or not there is a connection to the user device 14 in Operation 1. If there is a connection, the process goes to Operation 2 to obtain the location information from the location information service site by the function of the location information monitoring unit 62. The location information monitoring unit 62 is realized by performing the location information monitoring program. The location information is stored in the storage unit 54 as location information 72.

Subsequently in Operation 3, for example, if the usage start request is received with clicking of a personal information usage start folder 98 of the information transceiving folder screen 96 as shown in FIG. 7(B), the personal information 64 and the personal information monitoring program 66 are copied to the storage unit 80 of the user device 14 in Operation 4. Accordingly, the personal information 64-2 is self-extracted to be usable in the user device 14 at the same time the personal information monitoring program 66-2 is performed, which makes it possible to generate and store the usage record information.

Operation 5 checks whether or not the usage end request was transmitted from the user device 14. In the user device 14, for example, if the usage end request is received with clicking the personal information usage ending folder 100 shown in the information transceiving folder screen 96 of FIG. 7(B), the process proceeds to Operation 6. As shown in FIG. 8, the personal information 64 and the ending processing program 68 are copied to the user device 14 and are stored in the storage unit 80 as the personal information 64-2 and the ending processing program 68-2. The personal information 64-2 is self-extracted to be usable at the same time when the ending processing 68-2 is performed, which means that the usage ending processing is performed on the side of the user device 14.

Subsequently, Operation 7 checks whether or not a write request is transmitted from the user device 14 with the ending processing. If the write request is transmitted, the usage record information is received in Operation 8 and is written in the storage 54 as the usage record information 70.

Operation 9 checks whether or not there is a connection to the user device 14 as shown in FIG. 5. If the connection to the user device 14 is determined by Operation 9, the process proceeds to Operation 10 to check whether or not a read request of the usage record information is transmitted. If the read request is transmitted, the process proceeds to Operation 11 to read and transfer the stored usage record information.

Further, Operation 12 checks whether or not a communication request is transmitted from the user device 14. If a receiving output of the communication request of location information is obtained from the PHS module 28, the process proceeds to Operation 13 to use the PHS module 28 and access the external location information service site in order to obtain the location information, e.g., latitude/longitude, and the like. Then, the obtained location information is radio-transmitted to the provider device 12 by the PHS module 28.

The processing of Operation 1 to Operation 13 is repeated until a stop order is indicated by power down when a decreased power supply voltage is determined due to consumption of the battery power source 30 provided inside the memory card device 10 as shown in FIG. 2 in Operation 14.

Figure 10:
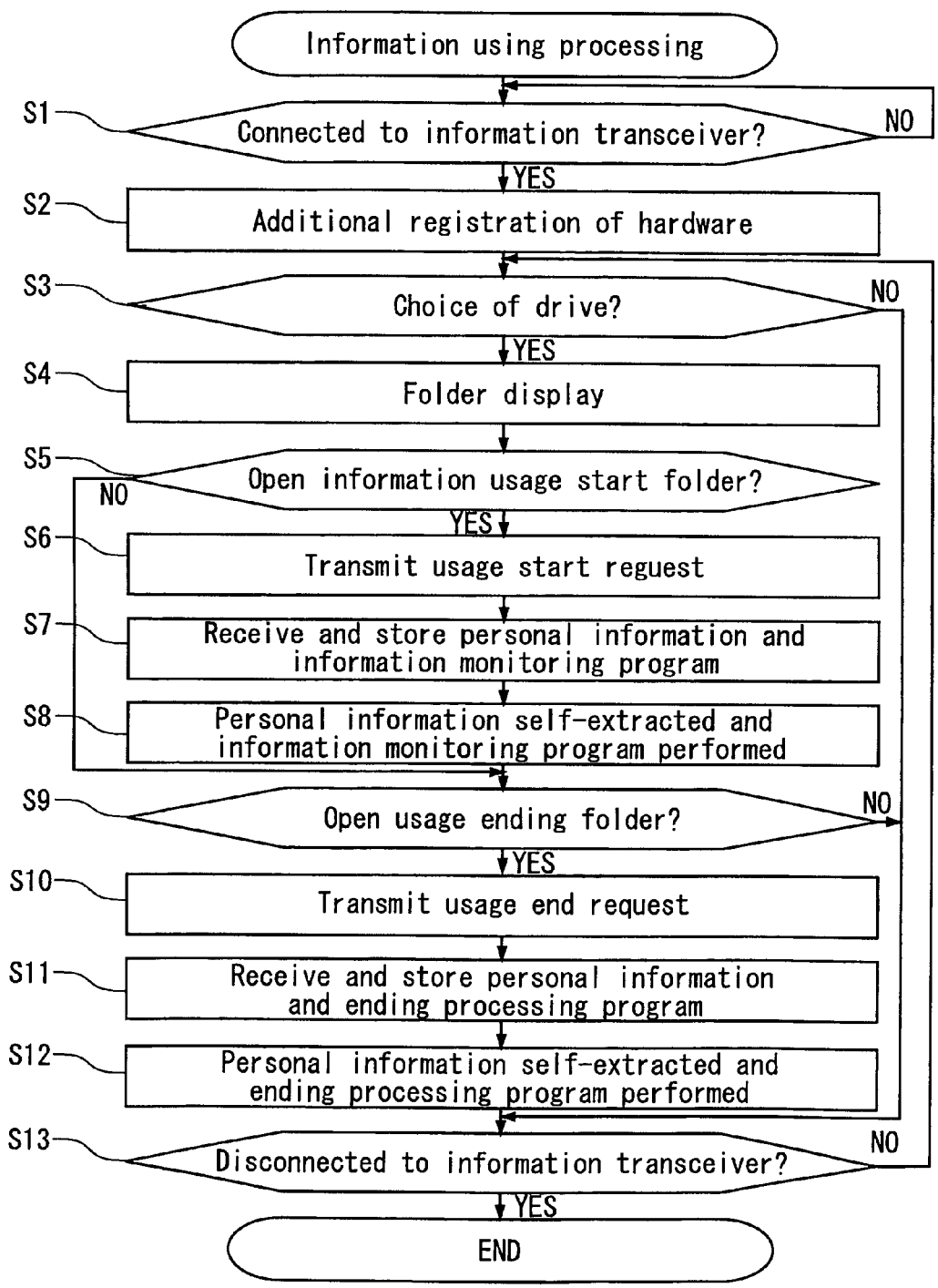
FIG. 10 is a flow chart showing information using processing of a user device according to an embodiment.

FIG. 10 is a flow chart showing information using processing of the user device of the present embodiment. An explanation with reference to FIG. 6 and FIG. 8 is as below.

Figure 7:
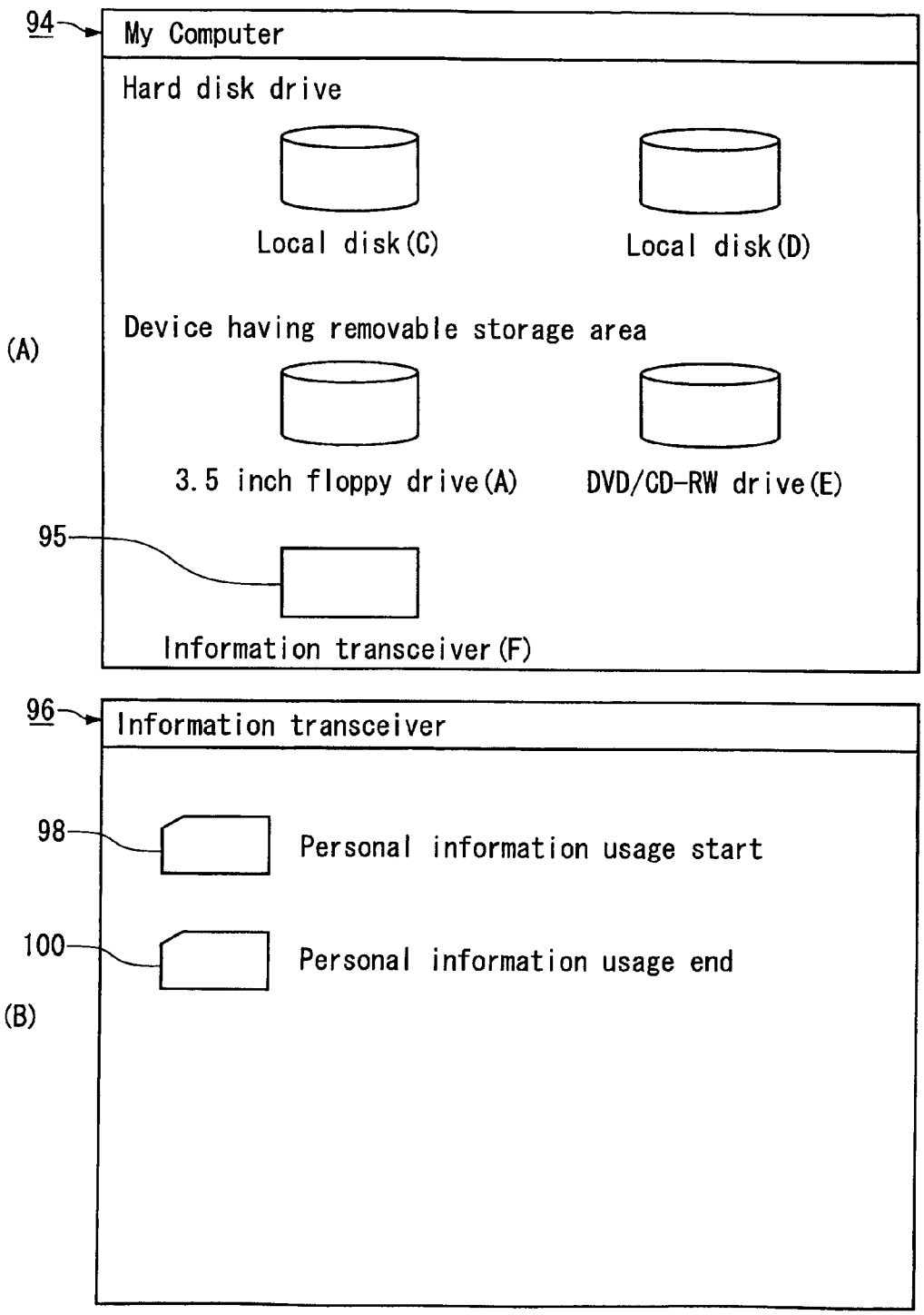
FIG. 7 is an illustration of a My Computer screen in a user device connected to a memory card device and an information transceiving screen which is opened from the My Computer screen.

As shown in FIG. 10, the information using processing checks whether or not there is a connection to the memory card device 10 used as the information transceiver in Operation 1. If there is the connection, the process proceeds to Operation 2. The OS of the user device 14 registers an additional hardware, thereby generating the device mark 95 in the My Computer screen 94 and the information transceiving folder screen 96 expanded from the device mark 95 as shown in FIG. 7

Subsequently, Operation 3 checks whether or not there is a choice of drive by clicking mouse of the device mark 95 of the My Computer screen 94 of FIG. 7(B). If there is the choice of drive, the process proceeds to Operation 4 to display the information transceiving folder screen 96 of FIG. 7(B). Then, Operation 5 checks whether or not the personal information usage start folder 98 is opened.

If the personal information usage start folder 98 is opened, the process proceeds to Operation 6 to transmit the usage start request to the memory card device 10. Accordingly in Operation 7, the personal information 64 and the personal information monitoring program 66 are received from the memory card device 10 and copied to the storage unit 80, and are then stored as the personal information 64-2 and the personal information monitoring program 66-2. Subsequently in Operation 8, the personal information 64-2 is self-extracted to be usable at the same time when the personal information monitoring program 66-2 goes to the performing state.

Subsequently, Operation 9 checks whether or not a usage ending folder is opened. After the personal information is used in the user device 14, the personal information usage ending folder 100 of FIG. 7 (B) is opened by clicking. Thus, if it is determined that the personal information usage ending folder 100 is opened, the process proceeds to Operation 10 to transmit the usage end request to the memory card device 10.

Subsequently in Operation 11, the copy processing is performed in a way that the personal information 64-2 and the ending processing program 68-2 which are transmitted from the memory card device 10 are received and stored in the storage unit 80. In Operation 12, the personal information 64-2 is self-extracted to be usable at the same time when the ending processing program 68-2 goes to the performing state. The processing of Operation 1 to Operation 12 is repeated until a disconnection to the memory card device 10 is determined in Operation 13.

Figure 11:
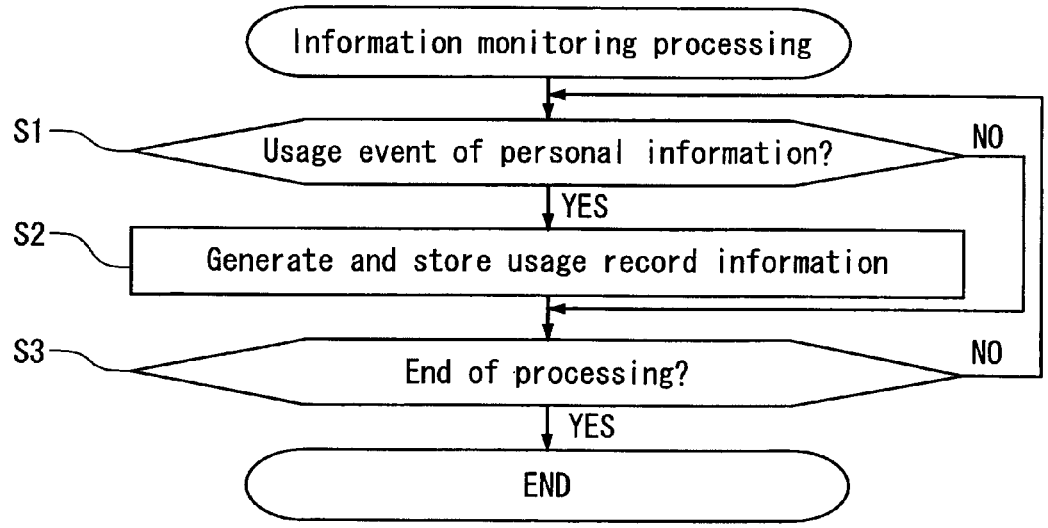
FIG. 11 is a flow chart of information monitoring processing performed in a user device.

FIG. 11 is a flow chart of the information monitoring processing performed in the user device and also a processing function realized by performing the personal information monitoring program 66-2 which is copied to the user device 14 from the memory card device 10.

As shown in FIG. 11, the information monitoring processing checks whether or not there is a usage event of the personal information in Operation 1. This usage event of the personal information includes print processing of the application 82 in the control unit 78 of the user device 14, mail transmitting by the mail processing unit 86, copy processing by the copy processing unit 90 or the like.

If the usage event is determined, the process proceeds to Operation 2 to generate and store the usage record information. The personal information management program is deleted by performing the ending processing program 68 in Operation 3, and Operation 1 and Operation 2 are repeated until the end of the processing is determined in Operation 3.

Figure 12:
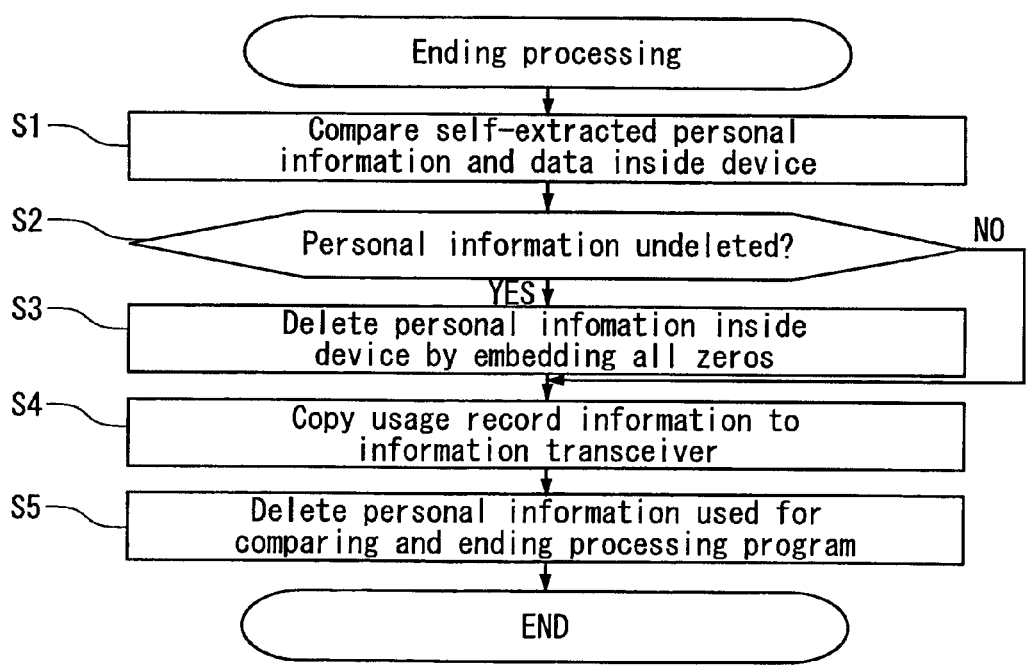
FIG. 12 is a flow chart of ending processing performed in a user device.

FIG. 12 is a flow chart of the ending processing performed in the user device and is also a processing function realized by performing the ending processing program 68-2 copied to the user device 14 from the memory card device 10.

As shown in FIG. 12, the ending processing compares the data of personal information self-extracted in Operation 1 and the data inside the user device. If the personal information is left in Operation 2, the process proceeds to Operation 3 to delete the remaining personal information in the user device by embedding valid data of zeros for all bits.

Subsequently in Operation 4, the usage record information 70-2 is read to be copied to the memory card device 10 which is used as the information transceiver. Finally in Operation 5, the personal information 64-2 used for comparing, the personal information monitoring program 66-2 and the ending processing program 68-2 themselves are deleted to complete a sequence of the ending processing.

Figure 13:
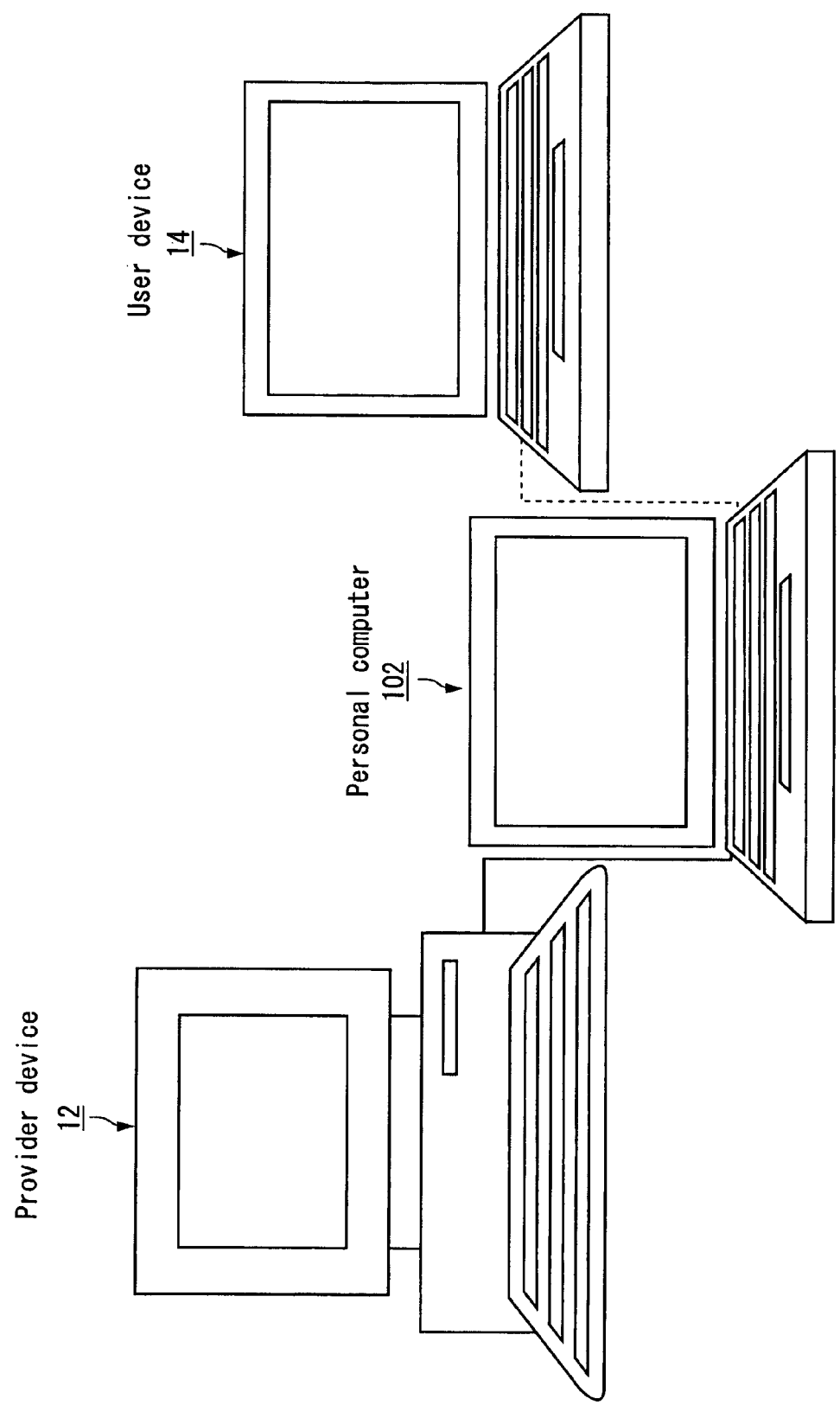
FIG. 13 is an illustration of another embodiment using a personal computer as an information transceiver.

FIG. 13 is an illustration diagram of another embodiment using a personal computer as the information transceiver. As shown in FIG. 13, although the provider device 12 and the user device 14 are the same as those of the embodiment of FIG. 1, a personal computer 102 having a radio communication module is used as the information transceiver of the present embodiment.

A hardware of the personal computer 102 is the user device 14 of FIG. 3 added with a PHS module. Accordingly, the hardware configuration of the personal computer 102 is basically the same as that of the memory card device 10.

It is possible to apply the function as it is, which is the same as that of the memory card device 10 shown in FIG. 4, to this hardware. That is, the configuration having the PHS module 28, the control unit 52 and the storage unit 54. The information transferring unit 56, the information monitoring unit 58, the ending processing unit 60 and the location information monitoring unit 62 are provided in the control unit 52, and the personal information 64, the personal information monitoring program 66, the ending processing program 68, the usage record information 70 and the location information 72 are stored in the storage unit 54, depending on the state of information usage.

Figure 14:
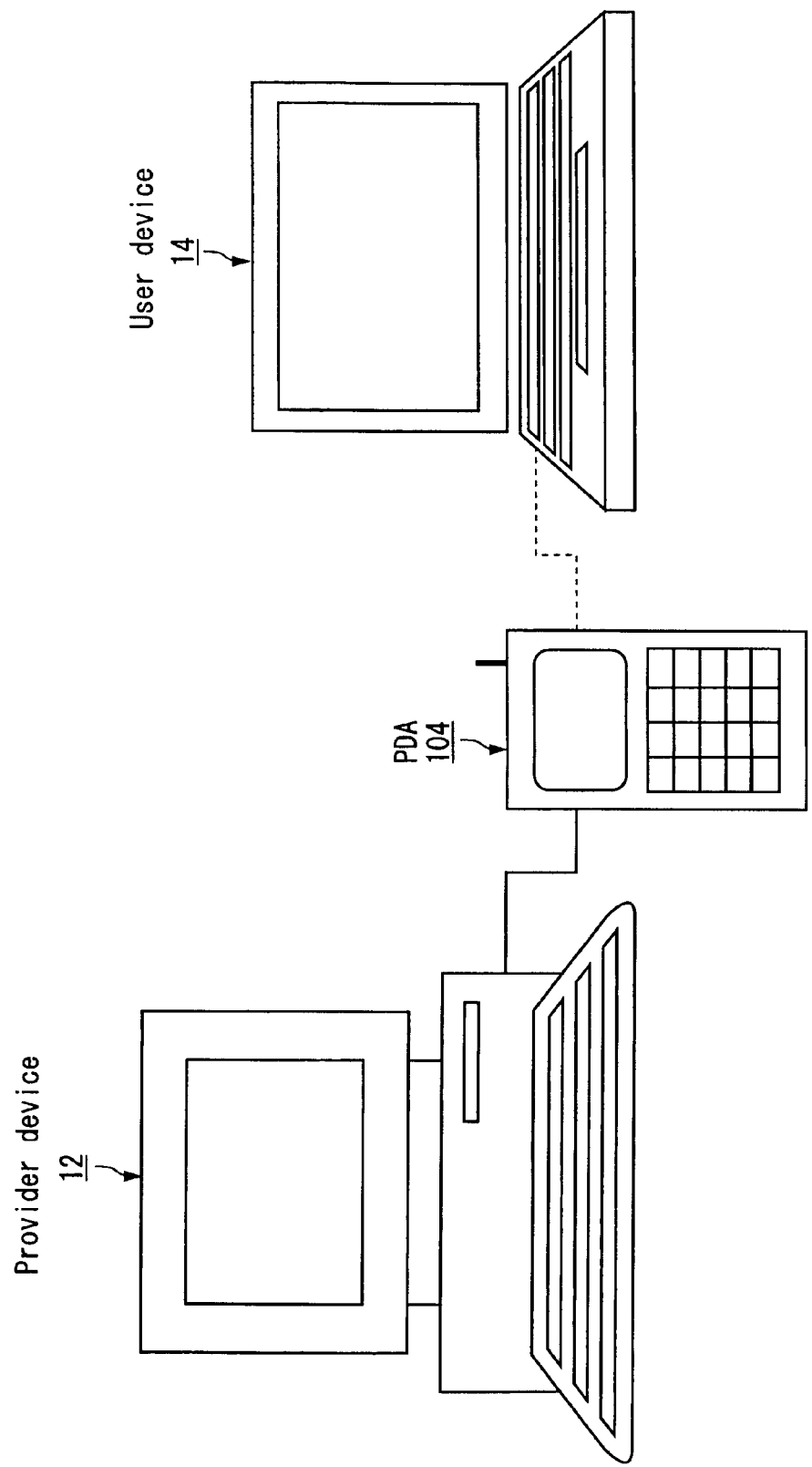
FIG. 14 is an illustration of another embodiment using a PDA as an information transceiver.

FIG. 14 is an illustration diagram of another embodiment using a PDA 104 with a radio communication module as the information transceiver. As shown in FIG. 14, the provider device 12 and the user device 14 are the same as those of the embodiment of FIG. 1. The PHS module 28 is mounted in the PDA 104 with the radio communication module as well as, for example, in the memory card device 10 of FIG. 2. This makes it possible for the PDA 104 with the radio communication module to have the same function as that of the memory card device 10 shown in FIG. 4.

Figure 15:
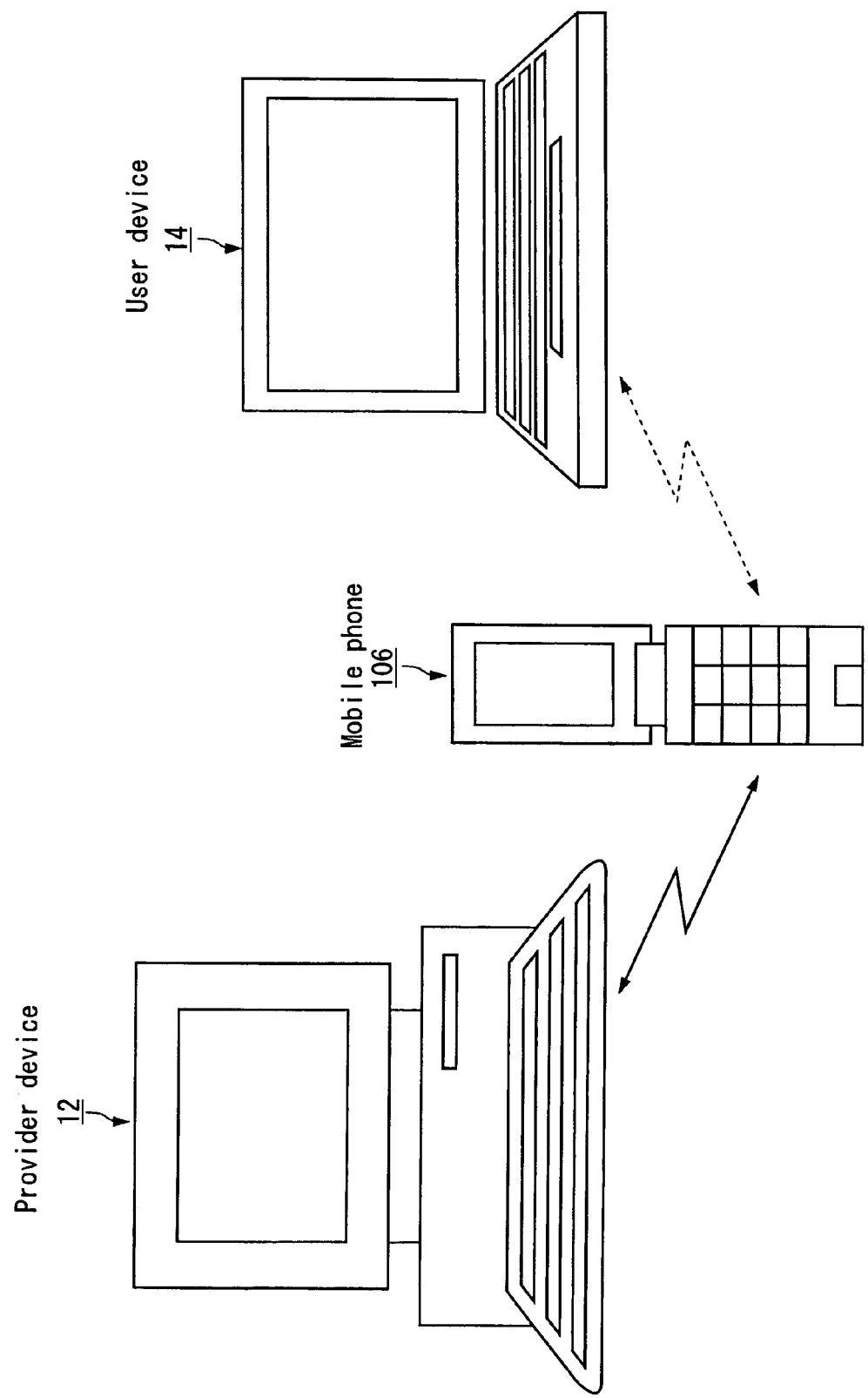
FIG. 15 is an illustration of another embodiment using a mobile phone as an information transceiver.

FIG. 15 is an illustration diagram of another embodiment using a mobile phone as the information transceiver. As shown in FIG. 15, although the provider device 12 and the user device 14 are the same as those of the embodiment of FIG. 1, a mobile phone 106 is used as the information transceiver.

The mobile phone 106 comprises the radio communication module as its original function and can reply to a communication request transmitted from the provider device 12 with location information. Since the mobile phone 106 is basically provided with the CPU 16, the RAM 20, the ROM 22 and the interface adaptor 24 which are the same as those of the memory card device 10, the mobile phone 106 can have the same function as that of the memory card device 10 as shown in FIG. 4. As a result, the mobile phone 106 can be used as it is as the information transceiver of the present embodiment.

Also, since the mobile phone 106 is provided with, for example, an infrared transmitting function and the like, as standard equipment, there is no need to be connected to the provider device 12 or the user device 14 by the interface signal line. Thus, the information transmission which is needed for information transceiving using infrared communication can be realized by a non-contact technique.

The present technology also provides a program for information transceiving which is performed in each computer of the memory card device 10, the personal computer 102 with the radio communication module, the PDA 104 with the radio communication module and the mobile phone 106, which are used as the information transceiver in the above-described present embodiment.

The program for information transceiving has the content shown in the flow chart of the information transceiving processing of FIG. 9. The information monitoring program and the ending processing program which are copied to the user device for performance by the information transceiving processing also have the content shown in the flow chart of FIG. 11 and FIG. 12.

Further, the present technology provides the storage medium in which the program for information transceiving is performed in each computer of the memory card device 10, the personal computer 102 with the radio communication module, the PDA 104 with the radio communication module and the mobile phone 106 are stored, which are used as the information transceiver.

In this case, the storage medium includes a database storing a program via lines, other computer system and its database or a transmission medium on lines, as well as a portable storage medium such as a CD-ROM, a floppy disk (R), a DVD disk, a magnet-optical disk and an IC card, and a memory medium such as a hard disk drive provided inside and outside of the computer system.

The above-described embodiment has an example of the personal information as usage information which has to be prevented from being leaked or misused. However, the usage information is not limited to the personal information. The information transceiving processing can be performed for transceiving appropriate information which is allowed to be used only in the user device as the usage information in the same way as for transceiving the personal information of the above-described embodiment.

As one of the information transceivers of the above-described embodiment, the memory card device 10 has a battery power source 30 inside. If a USB interface capable of supplying power is used as the interface connected to the provider device 12 or the user device 14, the memory card device 10 basically does not need to have the battery power source 30 inside.

However, and external battery power source has to be provided in order to respond of location information to a communication request transmitted from the provider device 12 in case the memory card device 10 is lost or the like. In this case, a capacitor having a large capacity can be provided inside the memory card device 10, and be charged with the power supplied by the connection to the USB interface.

The present embodiment has an example of a memory card, a computer, a PDA and a mobile phone as the information transceiver. Moreover, a mobile hard disk drive having a radio communication module is also applicable to the present embodiment.

Further, the above-described embodiment has an example that the usage start request and the usage end request are transmitted to the memory card device from the user device by operating the device folder screen. However, an appropriate operation screen can be transferred from the memory card device and shown in the user device.

The present technology includes appropriate modifications which do not detract a purpose and an advantage of the present technology, and do not have the limit of numbers shown in the above-described embodiment.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information transceiver comprising:
   a storage unit storing personal information transferred from a provider device;
   an information transferring unit transferring the personal information to a user device when a usage start request is received in a state of being connected to the user device;
   an information monitoring unit performing processing for making the user device monitor a usage of the personal information and store usage record information after the personal information is transferred to the user device;
   an ending processing unit performing processing for making the user device read and transfer the usage record information after the user device deletes the personal information when a usage end request is received in the state of being connected to the user device; and
   a location information monitoring unit obtaining present location information from an external location information service site for transmission when a communication request is received from the provider device.

2. The information transceiver according to claim 1, wherein the storage unit further stores an information monitoring program and an ending processing program which are transferred from the provider device,
   the information monitoring unit transfers the information monitoring program to the user device for performance, thereby monitoring the usage of the personal information and storing the usage record information, and
   the ending processing unit transfers the ending processing program together with the personal information to the user device for performance, thereby deleting the personal information, reading and transferring the usage record information, and also deleting the information monitoring program.

3. The information transceiver according to claim 1, wherein the information transceiver includes an input/output interface, a radio communication module, a memory card device having a processor and a memory, a computer apparatus having a radio communication module, a PDA device having a communication module, a mobile phone or a mobile magnetic disk.

4. The information transceiver according to claim 1, wherein the personal information is stored in a self-extracting data format and is self-extracted with usage operation in the user device.

5. The information transceiver according to claim 2, wherein the ending processing unit transfers the ending processing program to the user device for performance, thereby comparing the transferred personal information and internal information of the user device, and deleting the internal information by embedding invalid information in the internal information corresponding to the personal information.

6. An information transceiving method for transceiving information between a user device and a provider device, comprising:
   a storing operation storing personal information transferred from the provider device, an information transferring operation transferring the personal information to the user device when a usage start request is received in a state of being connected to the user device, an information monitoring operation performing processing for making the user device monitor usage of the personal information and store the usage record information after the personal information is transferred to the user device, an ending processing operation performing processing for making the user device read and transfer the usage record information after the personal information is deleted when a usage end request is received in the state of being connected to the user device, and a location information monitoring operation obtaining present location information from an external location information service device for transmission when a communication request is received from the provider device.

7. The information transceiving method according to claim 6, wherein the storage operation stores an information monitoring program and an ending processing program which are transferred from the user device, the information monitoring operation transfers the information monitoring program to the user device for performance, thereby monitoring the usage of the personal information and storing the usage record information, and the ending processing operation transfers the ending processing program together with the personal information to the user device for performance, thereby deleting the personal information, reading and transferring the usage record information, and deleting the information monitoring program.

8. The information transceiving method according to claim 6, wherein the information transceiver comprises an input/output interface, a radio communication module, a memory card device having a processor and a memory, a computer apparatus having a radio communication module, a mobile phone or a mobile magnetic disk device.

9. The information transceiving method according to claim 6, wherein the personal information is stored in a self-extracting data format and is self-extracted with usage operation in the user device.

10. The information transceiving method according to claim 6, wherein the ending processing operation transfers the ending processing program to the user device for performance, thereby comparing the transferred personal information and internal information of the user device and deleting the personal information by embedding invalid information in the internal information corresponding to the personal information.

11. A computer-readable non-transitory storage medium storing a program for making a computer transceiving personal information between a provider device and a user device perform processing, wherein the computer stores the personal information transferred from the provider device, the computer transfers the personal information to the user device when a usage start request is received in a state of being connected to the user device, the computer performs processing for monitoring the usage of the personal information and storing usage record information after the personal information is transferred to the user device, the computer performs processing for reading and transferring the usage record information after deleting the personal information when a usage end request is received in the state of being connected to the user device, and the computer obtains present location information from an external location information service device for transmission when a communication request is received from the provider device.

12. The information transceiver according to claim 1, wherein the user device deletes the personal information by embedding valid data of zeros for all bits.

* * * * *